US012802871B2

(12) United States Patent
Kulsangcharoen et al.

(10) Patent No.: US 12,802,871 B2
(45) Date of Patent: Nov. 17, 2026

(54) HEAT TRANSFER FROM TRANSFORMER WINDINGS

(71) Applicant: Hamilton Sundstrand Corporation, Charlotte, NC (US)

(72) Inventors: Ponggorn Kulsangcharoen, West Midlands (GB); Aaron Day, Sevenoaks (GB)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 756 days.

(21) Appl. No.: 18/205,087

(22) Filed: Jun. 2, 2023

(65) Prior Publication Data

US 2023/0395313 A1 Dec. 7, 2023

(30) Foreign Application Priority Data

Jun. 2, 2022 (EP) .................................... 22275073

(51) Int. Cl.

| | |
|---|---|
| ***H01F 27/24*** | (2006.01) |
| ***H01F 27/32*** | (2006.01) |
| ***H01F 30/02*** | (2006.01) |
| ***H01F 41/12*** | (2006.01) |

(52) U.S. Cl.

CPC ........... *H01F 27/325* (2013.01); *H01F 27/24* (2013.01); *H01F 30/02* (2013.01); *H01F 41/12* (2013.01)

(58) Field of Classification Search

CPC .......... H01F 41/12; H01F 30/02; H01F 27/24; H01F 27/325; H01F 27/2876

USPC ...... 333/177, 181, 185; 336/55, 61, 62, 175, 336/176, 213

See application file for complete search history.

(56) References Cited

U.S. PATENT DOCUMENTS

| | | | | |
|---|---|---|---|---|
| 9,230,726 | B1 | 1/2016 | Parker et al. | |
| 2013/0187738 | A1 | 7/2013 | Pal et al. | |
| 2013/0293330 | A1 | 11/2013 | Wu et al. | |
| 2018/0322995 | A1 * | 11/2018 | Kim ...................... | F28D 15/043 |
| 2021/0319945 | A1 | 10/2021 | Kulsangcharoen et al. | |

FOREIGN PATENT DOCUMENTS

| | | | |
|---|---|---|---|
| DE | 8133597 | U1 | 4/1982 |
| DE | 102021104224 | A1 | 9/2021 |
| GB | 2089764 | A | 6/1982 |
| JP | 3311120 | B2 | 8/2002 |
| JP | 2008153293 | A | 7/2008 |

(Continued)

OTHER PUBLICATIONS

Foreign Translation of JP2008/153293 (Year: 2008).*

(Continued)

*Primary Examiner* — Rakesh B Patel

(74) *Attorney, Agent, or Firm* — CANTOR COLBURN LLP

(57) ABSTRACT

A bobbin for receiving a transformer winding includes a non-metallic tubular body having at least one wall having an outer surface onto which the transformer winding is wound, in use, and an inner surface defining a passage to receive a transformer core, in use, the bobbin comprising a plurality of openings formed through the wall(s) from the outer surface to the inner surface. The bobbin also includes a thermally conductive material provided in the openings.

16 Claims, 2 Drawing Sheets

(56) References Cited

FOREIGN PATENT DOCUMENTS

| | | | |
|---|---|---|---|
| JP | 2013229353 | A | 11/2013 |
| TW | I641004 | B | 11/2018 |

OTHER PUBLICATIONS

Abstract for JP2008153293 (A), Published: Jul. 3, 2008, 1 page.
Abstract for JP2013229353 (A), Published: Nov. 7, 2013, 1 page.
Abstract of DE102021104224 (A1), Published: Sep. 16, 2021, 1 page.
Abstract of JP3311120 (B2), Published: Aug. 5, 2002, 1 page.
European Search Report for Application No. 22275073.9, mailed Dec. 23, 2022, 9 pages.

* cited by examiner

HEAT TRANSFER FROM TRANSFORMER WINDINGS

CROSS REFERENCE TO RELATED APPLICATION

This application claims priority to European Patent Application No. 22275073.9 filed Jun. 2, 2022, the entire contents of which is incorporated herein by reference.

TECHNICAL FIELD

The present disclosure is concerned with enhancing or improving the transfer of heat generated in a transformer away from the transformer coils, and particularly from the windings of auto-transformer rectifier units (ATRUs).

BACKGROUND

Transformers are used in many electrical systems to transform voltage or current at one level to voltage and/or current at a different level. A transformer consists of one or more windings or coils of conductive material wound around a ferrous or magnetic core such that current flow through one winding or part of a winding will induce current flow through another winding or part of a winding. Many systems e.g. power converters used in applications such as aircraft, convert AC power to DC power to drive DC loads. To reduce harmonics in such systems, it has become common to use autotransformers which only have a single winding acting as both the primary and the secondary winding of the system. Auto-transformers are used, for example, in power conversion systems on aircraft to provide power to the various electric loads.

In many applications, the size and weight of the transformer is an important factor, whilst ensuring high performance and efficiency. Developments in transformer technology enable relatively small transformer designs to be highly effective and efficient in power conversion and noise reduction. A limiting factor, however, in reducing component size, is the heat generated in the transformer. Core losses and winding losses cause more heat to be generated in the transformer. Further, the greater the density of the windings, the greater the resistance to the heat generated in the innermost windings, which, if not effectively dissipated, causes a rise in the overall temperature of the transformer, which can damage parts and is a fire risk. In addition, as operating temperature increases, the saturation flux density of the core decreases. High levels of heat generation, therefore, reduce the efficiency, safety and life of the transformer. Natural cooling methods, although inexpensive, are not typically very effective and can lead to bulky designs. Active cooling methods are more effective, but require additional cooling systems and energy and can be expensive. For these reasons, it is common for transformers to be designed to be larger than is actually necessary to produce the required power and voltage, because the larger size enables heat to be dissipated more effectively and reduces the above risks. There has to be a trade-off, therefore, between safety and operating performance on the one hand and miniaturisation on the other.

U.S. Pat. No. 9,230,726 proposes inserting cooling pipes into the transformer to remove the heat generated in the windings. The cooling pipes, however, take up space between the windings and the core and reduce their coupling effect and possible also the winding inductance factor. Further, this solution uses an active cooling system, with a heat exchanger, which adds to the overall weight of the system, thus effectively cancelling out any size and weight gains achieved by making the transformer smaller.

US 2013/0293330 improves the heat transfer from the innermost winding layer, where the peak temperatures are often associated, to pass through to the transformer core, from where heat can be more easily dissipated, using a laminated-metallic thermally conductive bobbin onto which the windings are wound. The conductive properties of the metallic bobbin, however, disrupts the transformer electromagnetic flux flow, which directly affects its electrical performance.

There is, therefore, a need for improving heat dissipation in transformers to allow them to be made smaller, without the above disadvantages.

SUMMARY

According to the invention, there is provided a bobbin for receiving a transformer winding, the bobbin comprising a non-metallic tubular body having at least one wall having an outer surface onto which the transformer winding is wound, in use, and an inner surface defining a passage to receive a transformer core, in use, the bobbin comprising a plurality of openings formed through the wall(s) from the outer surface to the inner surface, and further comprising a thermally conductive material provided in the openings.

Also provided is a transformer and a method of forming a bobbin and a transformer.

BRIEF DESCRIPTION

Examples according to the disclosure will now be described with reference to the drawings. It should be noted that these are examples only, and variations are possible within the scope of the claims.

DETAILED DESCRIPTION

Figure 1:
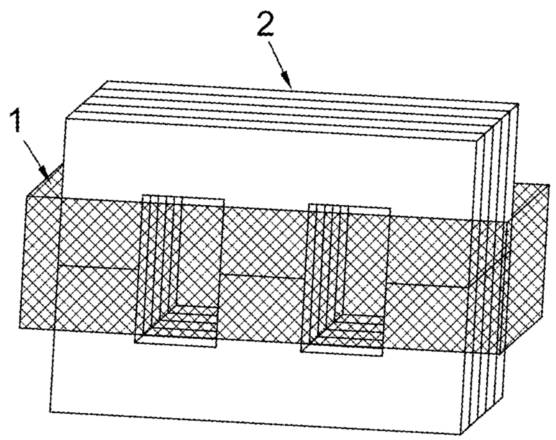
FIG. 1 shows a typical 3-phase transformer design.

Referring to FIG. 1, a typical transformer is shown. The example shown is a three-phase transformer having three sets of windings each wound around a bobbin (in the drawing reference numeral 1 represents the combination of the bobbins and the windings) and a magnetic core assembly around which the windings are provided. The number of phases can, however, vary. The windings are wound around the bobbin which is fitted around the core. In this example, the core assembly comprises two opposing E shaped core elements 2 (known as an EE transformer core), which defines three core legs each having a set of coils, on a bobbin, provided therearound. Other core designs such a E cores or toroidal cores are also known in the art. In one example, the windings are formed by coils of conductive wires but other forms of conductor could be used to form the winding. An insulating cover (not shown) is typically formed around the windings on the bobbin.

The bobbin is typically formed as a tubular body having walls having an outer surface onto which the winding is wound, and an inner surface defining a passage to receive the core. The shape and dimensions of the body will depend on the transformer design including the shape and design of the core. In the example shown, the bobbins have a square or rectangular cross-section but other shapes can be envisaged.

As mentioned above, typically, the conductors forming the windings have a large number of closely wound turns to provide the required power/voltage and this results in the generation of heat in the windings, particularly the innermost windings closest to the bobbin body.

The solution provided by the present disclosure provides a modified bobbin such that heat can be more easily transferred from the winding without increasing the overall size and weight of the assembly and without affecting the flow of electromagnetic flux of the transformer.

The modification involves forming the bobbin of a non-metallic material and providing openings in the wall of the bobbin body. A thermally conductive material is provided in the openings.

Various non-metallic materials can be used for the bobbin, including plastics. Depending on the choice of material, the bobbin can be formed by additive manufacturing or 3D printing processes to simplify the manufacture of various shapes and sizes of the bobbin and of the openings. The use of non-metallic materials can also reduce the cost and/or the weight of the bobbin.

The thermally conductive material can be one of many known heat transfer agents such as epoxy resin or a fine ceramic and can either fill or partially fill or line the openings. The thermally conductive material in the openings acts as a heat transfer agent through the bobbin and, further, means that air cannot become trapped in the openings and so the problem of an insulating air trap between the core and the winding is avoided.

The openings can be provided at locations along the line and around the body of the bobbin, according to the transformer design and requirements. The number, size and shape of the openings can also be selected as required. For example, the openings may be in the form of rectangular slots or may be in the form of larger rectangular openings or windows (here, we refer to a 'slot' as an opening which is elongate and has a length dimension substantially larger than a width direction, whereas a 'window' is a wider form of slot). Other shapes e.g. circular, oval etc. openings may also be envisaged.

As with the known examples described above, the bobbin may have various tubular shapes, e.g. rectangular in cross-section, square, circular, oval or other shape. For rectangular or square shapes, for example, the wall will be formed of four sides. The openings may be provided in all four sides or only some sides. Different shaped openings could be provided on different sides or in different portions of the sides. Similarly, for more rounded bobbins, openings may be provided at selected locations and may have selected shapes, sizes and numbers.

Examples of modified bobbins according to the disclosure will be described with reference to FIGS. 2 and 3.

Figure 2:
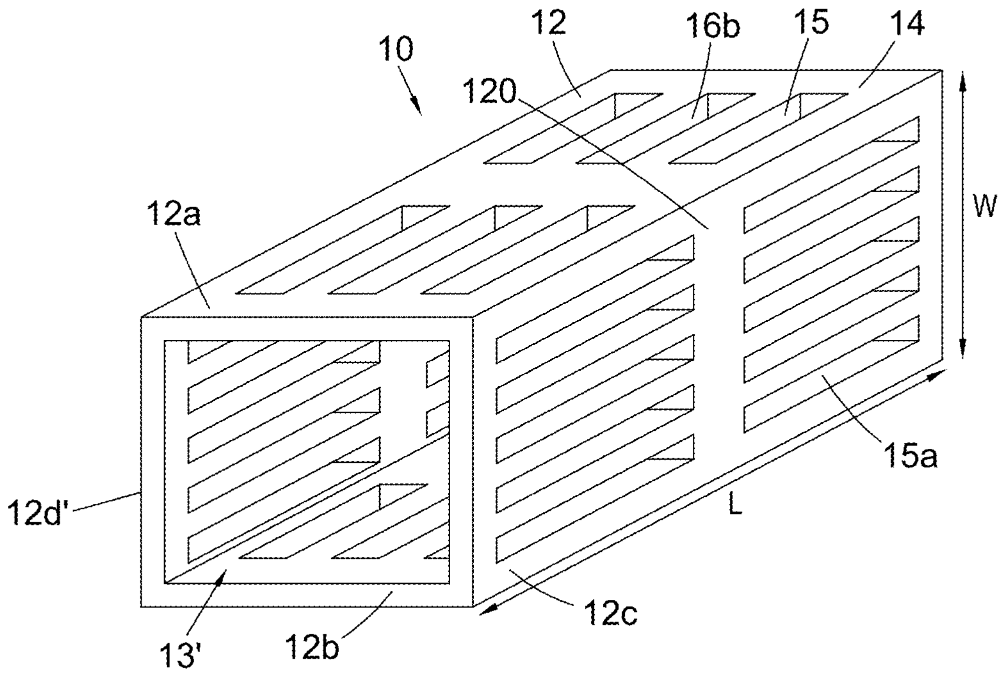
FIG. 2 shows an example of a bobbin according to the disclosure.

FIG. 2 shows a bobbin 10 having a rectangular cross-section defined by four sides—a top side 12*a*, a bottom side 12*b*, a right side 12*c* and a left side 12*d* (from the point of view of the Figure). The sides together form the bobbin wall 12, the inner surface 13 of which defines a passage for receiving the core (e.g. a core 2 such as shown in FIG. 1). The outer surface 14 of the wall is the surface that, in use, is in contact with the winding (not shown here) wound around the bobbin 10.

The bobbin is formed of a non-metallic material to match the transformer core around which it is to be placed.

The openings 15 are formed through the wall 12 of the bobbin at selected locations. In the example of FIG. 2, elongate slots 15*a* are formed in the right and left side walls. In this example, there are two columns of four slots—i.e. in the length direction L, there are two slots spaced by a solid portion 120 of wall, with four sets of slots in the width W direction. The number of slots can, of course, be varied. Also in the example of FIG. 2, the openings 15*b* on the top side 12*a* are wider than the slots 15*a* in the side wall and could be referred to as 'windows'. In this example, there are two sets of three spaced apart windows formed through the wall. Again, the number and sizes of the openings can be varied. In other examples (not shown here) not all of the walls may be provided with openings.

Figure 3:
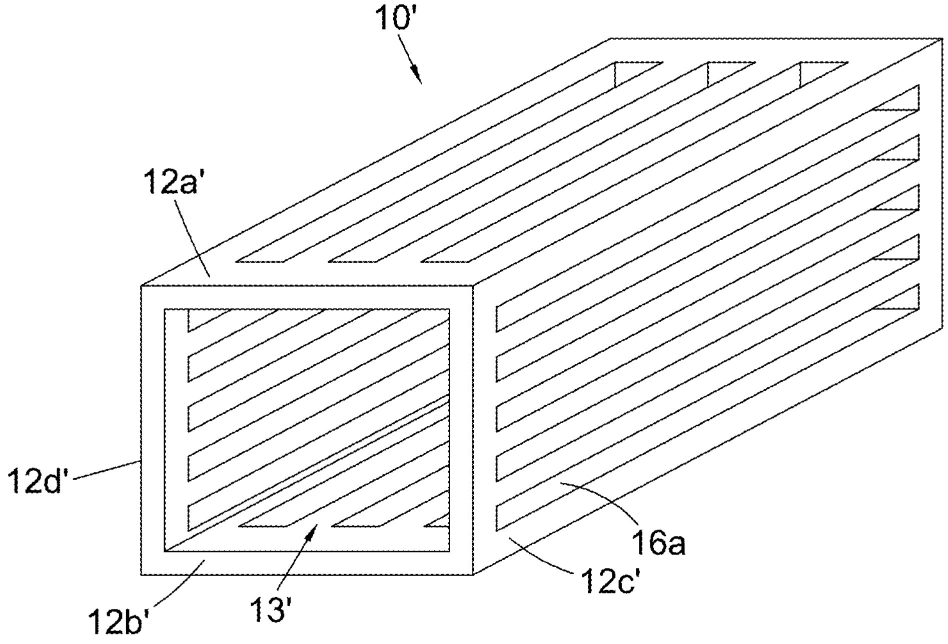
FIG. 3 shows an alternative bobbin according to the disclosure.

FIG. 3 shows an alternative design of a bobbin 10', again having four walls 12'*a*, 12'*b*, 12'*c* and 12'*d*, the inner surfaces 13' defining a passage, but where the slots are not split into several slots in the length L direction but, rather, a single slot 16*a* extends along the length of the wall(s).

The choice of number and size and shapes of openings is a design choice and involves a trade-off between greater heat dissipation (more/bigger openings) and structural strength and integrity of the bobbin (more solid wall). Providing more openings may also be more difficult and expensive to manufacture, although this is less so if additive manufacturing processes are used.

To enhance the dissipation of heat through the bobbin to the core 2, to improve heat transfer from the windings, especially the inner windings, a thermally conductive material is provided in the openings 15. This may be provided in the openings by e.g. a known resin-penetration process for the whole transformer The modified bobbin may be used for all types of transformer having windings provided around a core, and has been found to provide particular heat transfer improvements in 12-pulse and 18-pulse auto-transformers. As mentioned above, the concept applied to modify the bobbin is applicable to all known core designs, including E, EE, U, I, C etc. cores.

The invention claimed is:

1. A bobbin for receiving a transformer winding, the bobbin comprising:

a non-metallic tubular body having at least one wall having an outer surface onto which the transformer winding is wound, and an inner surface defining a passage to receive a transformer core, the non-metallic tubular body comprising a plurality of openings formed through the at least one wall from the outer surface to the inner surface; and a thermally conductive material provided in the plurality of openings;

wherein the bobbin has a rectangular cross-section formed by four walls and the plurality of openings are provided in one or more of the four walls, wherein at least one of the plurality of openings has a shape different than others of the plurality of openings.

2. The bobbin of claim 1, wherein the at least one of the plurality of openings has an elongated cross-section.

3. The bobbin of claim 1, wherein the thermally conductive material is an epoxy resin.

4. The bobbin of claim 1, wherein the thermally conductive material is a ceramic material.

5. The bobbin of claim 1, formed by an additive manufacturing process.

6. A method of forming a transformer, the method comprising:

providing: a bobbin as claimed in claim 1;

winding a transformer winding around the bobbin; and locating the bobbin around a core assembly of the transformer.

7. The method claim 6, wherein at least one of the plurality of openings have an elongated cross-section.

8. The method claim 6, wherein the thermally conductive material is an epoxy resin.

9. The method claim 6, wherein the thermally conductive material is a ceramic material.

10. The method claim 6, wherein the bobbin is formed by an additive manufacturing process.

11. A transformer comprising:

a transformer core assembly;

at least one bobbin provided around the transformer core assembly, wherein the at least one bobbin includes:

a non-metallic tubular body having at least one wall having an outer surface onto which the transformer winding is wound, and an inner surface defining a passage to receive a transformer core, the non-metallic tubular body comprising a plurality of openings formed through the at least one wall from the outer surface to the inner surface; and a thermally conductive material provided in the plurality of openings; and a conductive transformer winding wound around each bobbin;

wherein the transformer is an autotransformer.

12. The transformer of claim 11, wherein the transformer core assembly comprises a plurality of core legs, the transformer comprises a bobbin around each of said plurality of core legs.

13. The transformer of claim 12, wherein the core assembly is an E-shaped or EE-shaped core.

14. The transformer of claim 11, wherein at least one of the plurality of openings of the at least one bobbin has an elongated cross-section.

15. The transformer of claim 11, wherein the thermally conductive material is an epoxy resin.

16. The transformer of claim 11, wherein the thermally conductive material is a ceramic material.

* * * * *